April 21, 1925.  1,534,776

D. EISINGA

BOLTING UP PIN

Filed Aug. 31, 1918

INVENTOR
Dirk Eisinga
BY
G. Wright Arnold
ATTORNEY.

Patented Apr. 21, 1925.

1,534,776

UNITED STATES PATENT OFFICE.

DIRK EISINGA, OF SEATTLE, WASHINGTON.

BOLTING-UP PIN.

Application filed August 31, 1918. Serial No. 252,147.

*To all whom it may concern:*

Be it known that I, DIRK EISINGA, a subject of Holland, residing at Seattle, in the county of King and State of Washington, have invented a certain new and useful Improvement in Bolting-Up Pins, of which the following is a specification.

This invention relates to bolting-up pins and more particularly to bolting-up pins employed in constructing the hull of ships, and in other industries where plates must be held firmly clamped together until permanently so held by riveting.

Heretofore, it has been the practice to hold the plates in place until a riveter secures them permanently by rivets to use bolts and nuts of the common threaded design. Ordinarily these are placed in rivet holes at short intervals. This practice requires one operator to hold the bolt against turning while a second operator on the opposite side of the steel plate turns the nut into place, thereby drawing together the plates and firmly clamping the same in position for riveting. The difficult position which often must be taken by an operator and the great stress exerted in drawing the plates tightly together, as well as the putting of many washers in place upon the bolt, renders the bolting-up process slow, expensive and cumbersome. Furthermore, the unbolting process at the time of riveting consumes much time, often requiring an extra group of operators. Unbolting is also rendered difficult on account of the threads of the bolts and nuts becoming rusty by reason of their exposure to the weather. This rusting of the threads also grievously interferes with the bolting-up process when the attempt is made to use the bolts and nuts a second time. Moreover, the process of unbolting results in the deforming of the threads and of the bolts in a large percentage of cases which causes a great loss in labor resulting from the attempt to use the bolts and nuts before the discovery of the deformation. Further, there must be added the loss arising by reason of the scrapping of such deformed bolts and nuts after being used once or twice. Moreover, bolts and nuts of the threaded design make it obligatory to employ for the bolting-up process bolts of different lengths, a situation due to the varying thickness of different plates, as well as by the varying number of plates to be clamped together at different joints which condition of different lengths results in rendering the process of bolting-up burdensome by making assortment and selection necessary.

The principal object of the present invention is to provide a bolting-up pin which has no threads by providing a pin with a tapering shank against which a threadless nut is caused to bear by a wedging pin to form a holding device which will securely maintain the plates in clamped position until permanently so held by riveting.

Other primary objects of this invention are to provide a bolting-up pin which can be used repeatedly, since operation of the same does not subject it to injury arising by reason of rusting, and is only remotely subjected to deformation, which pins are of a uniform length, thus avoiding all delay in selecting pins of proper length for a given joint and which at the same time dispenses with the use of washers as fillers, which pins can be quickly released by the riveter-operator thus making unnecessary the services of an entire separate group of unbolting operators, which pins while being put in place require no "holder-on" operator to prevent turning and which pins are mostly inexpensively formed being of one simple forging.

To the end of attaining the aforesaid objects, I provide a pin having a shank preferably rectangular in form in cross section with at least one of its sides tapering to one end which has a head integrally formed on the pin, the other end having a head preferably no larger than the adjacent part of the shank proper, said last head being adapted to afford means to permit a clamping device to grip the pin. This means is preferably a deep groove. Further, I provide a nut to fit upon the shank of the pin without a thread bearing and adapted to be held securely intermediate the length of the shank of the pin at such point as may be desired, preferably by means of a wedge. Manifestly, a set screw in the nut would also serve to make the nut fast upon the shank.

The above mentioned objects of my invention together with others inhering in the same are attained by the mechanism illustrated in the following drawings, the same being merely a preferred form of embodiment of my invention, throughout which drawings like reference numerals indicate like parts:

Figure 1:
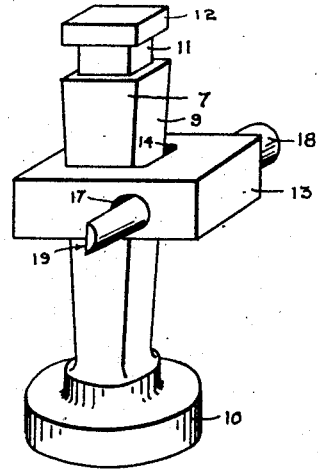
Fig. 1, is a view in perspective of a bolting-up pin and nut embodying my invention.
Figure 2:
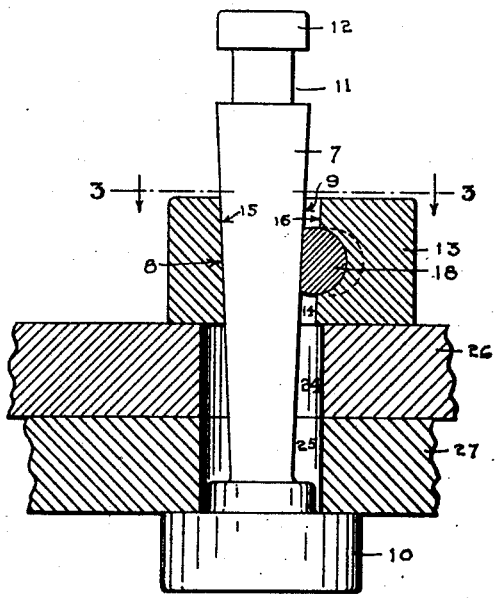
Fig. 2, is a vertical longitudinal section of the pin and nut with two plates interposed.

The shank 7 of a bolting-up pin is formed with preferably two similarly tapering faces 8 and 9 oppositely disposed and tapering towards an enlarged integrally formed head 10 which end of the shank is herein designated as the head-end, the said end being opposite to the tail-end; that is, the end over which the nut is applied. Near the opposite end portion of the shank is the groove 11, which forms the tail 12, the function of which is to afford means for gripping the pin. A nut 13 is provided with a rectangular vertical hole 14 in order to adapt the nut to fit upon the shank 7. The oppositely disposed faces 15 and 16 of this vertical hole have the same taper as the faces 8 and 9 of the shank 7.

The nut 13 is further provided with a horizontal hole 17 preferably round of uniform diameter extending obliquely through the nut at a small angle and partially intersecting the vertical hole along one of its sides.

A wedging pin 18 preferably round adapted to fit loosely in hole 17, is formed with a flat face 19, the plane of said face being at the same angle to the longitudinal axis of the pin as the horizontal hole is oblique. In the modified form of the nut and pin, Fig. 5, the horizontal hole 20 is made rectangular instead of round and extends straight across the nut as respects that part of said hole intersecting the vertical hole 14 but obliquely across the nut as respects the back wall of the said horizontal hole. A pin 21 adapted to be inserted in the horizontal hole 20 of the modified form of nut, is formed as a wedge to fit said hole 20, said pin having a tapering face 22 of the same taper as the face 9 of the shank. The modified form of the shank shown in Fig. 6 is only tapering as respects its one bearing face 23. The head 10 is provided with the centering shoulder 33, whereby the pin is more readily centered in the hole of the plates.

The operation of my invention is as follows:—

Figure 4:
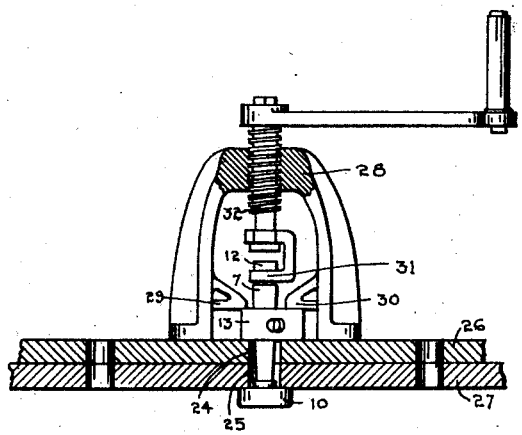
Fig. 4, is a view in side elevation of a pin embodying my invention and a simple device whereby said pin may be clamped into position.
Figure 3:
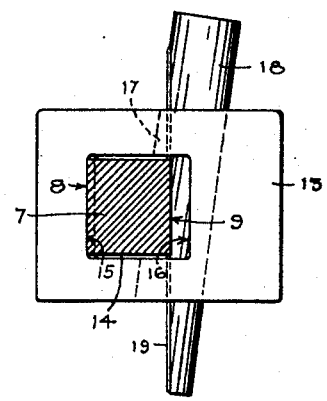
Fig. 3, is a view in cross-section on line 3—3 of Fig. 2.

The shank 7 of the pin is pushed through the matching rivet holes 24 and 25 of two plates 26 and 27 respectively, Fig. 4, and the nut 13 is placed upon the shank 7 with the tapering faces 15 and 16 of the walls of this vertical hole paralleling the tapering faces 8 and 9 of said shank 7. Thereupon any suitable clamping device such as 28 is positioned over the said pin with the shoulders 29 and 30 of this device bearing upon the edges of the nut 13 and the swivel-mounted claw-end portion 31 of the screw 32 of the said device gripping the head 12 of the shank 7.

The screw 32 is then moved upward which obviously draws the two plates 26 and 27 tightly together by pulling upward on the shank 7 of the pin and pressing downward upon the nut 13. When the plates 26 and 27 are drawn together sufficiently, then the pin 18 is inserted in the horizontal hole 17, with the flat face 19 bearing against tapered face 9 of the shank 7, adjustment of the flat face of the pin to the tapering face of the shank being readily made on account of the round character of the pin. This feature of the form of the round pin 18 renders it possible to have the walls of the vertical hole of the nut 13 formed without any tapering to match the taper of the shank 7, thus making the application of the nut to the shank indifferent to the tapering of the face or faces of the shank. A sharp blow against the pin 18 makes said pin fast. Thereupon, the clamping device 28 is removed and obviously any tendency of the plates to spring apart serves only to make the wedging pin 18 bear the harder against the tapering face 9 of the shank 7.

Figure 5:
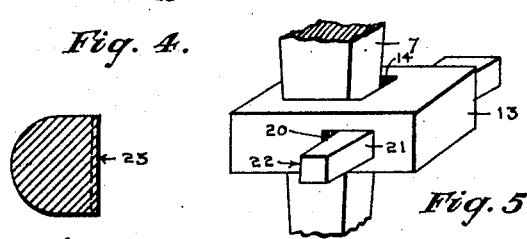
Fig. 5, is a view in perspective of a portion of the shank and a modified form of nut and pin.
Figure 6:
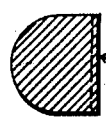
Fig. 6, is a cross-sectional view of a modified form of shank.

In the modified form of nut and pin, Fig. 5, the pin 21 is inserted in the horizontal hole so as to cause its tapering face 22 to bear against the tapering face 9 of the shank 7. A sharp blow will make the pin 21 fast as in the case of the round pin.

Obviously, changes may be made in the forms, dimensions and arrangements of the parts of my invention without departing from the principle thereof, the above setting forth only a preferred form of embodiment. Plainly, instead of a wedging pin, the nut could be made fast upon the shank by the well known means of a set screw.

I claim:

1. In combination with a bolting-up pin, a threadless nut having a hole therethrough whereby said nut is adapted to loosely fit the shank of a threadless bolting-up pin, said hole being partially intersected by a round hole of uniform diameter from side to side whereby said nut is adapted to receive a wedging pin.

2. A bolting-up pin embodying a shank with one face tapering to a head integrally formed at one end of said shank and means upon the opposite end portion of said shank whereby said pin may be gripped, a nut having a vertical hole therethrough whereby said nut is adapted to fit upon the shank of a bolting-up pin and means whereby said nut may be made fast at any point intermediate the length of the said shank.

3. A bolting-up pin embodying a shank with one face tapering to a head integrally formed at one end of said shank and means upon the opposite end portion of said shank whereby said pin may be gripped, a nut having a vertical hole therethrough whereby said nut is adapted to fit upon the shank of a bolting-up pin, said hole being partially intersected by a horizontal hole extending obliquely across said nut, and a round wedging pin which is adapted to fit said horizontal hole and is provided with a flat face the plane of said face being at an angle to the longitudinal axis of the said wedging pin whereby said nut may be made fast at any point intermediate the length of said shank.

4. A bolting-up pin embodying a shank with one face tapering to a head integrally formed at one end of said shank and means upon the opposite end portion of said shank whereby said pin may be gripped, a nut having a vertical hole there through which adapts said nut to fit upon said shank, said hole being partially intersected by a horizontal hole extending squarely across said nut as respects that part of said horizontal hole which intersects with the vertical hole and obliquely across the nut as respects the back wall of said horizontal hole, and a wedging pin whereby said nut may be made fast at any point intermediate the length of said shank.

5. In a bolting-up pin, a nut having a hole therethrough whereby said nut is adapted to receive the shank of a bolting-up pin, said hole being partially intersected by a round hole the axis of which extends obliquely across said shank receiving hole said axis lying in a plane at right angles to the axis of the said shank of a bolting-up pin, whereby said nut is adapted to receive a wedging pin having a smooth flat face disposed to bear in the first-named hole.

6. In a bolting-up pin, a pin embodying a shank tapering to a head integrally formed at one end of said shank, the diameter of said shank being greatest at the end opposite the head end, which head is provided with a centering shoulder, a nut disposed to fit upon said shank, and a wedging pin disposed to clamp said nut intermediate the length of said shank at such point as may be desired.

In witness whereof, I hereunto subscribe my name this 24th day of August, A. D. 1918.

DIRK EISINGA.